(12) United States Patent
Berbee et al.

(10) Patent No.: US 10,435,489 B2
(45) Date of Patent: Oct. 8, 2019

(54) PROCESS FOR PRODUCING ETHYLENE-BASED POLYMERS WITH REDUCED GEL COUNTS AND LOW REACTOR FOULING

(71) Applicant: Dow Global Technologies LLC, Midland, MI (US)

(72) Inventors: Otto Berbee, Terneuzen (NL); Stefan Hinrichs, Terneuzen (NL); Nhi Dang, Terneuzen (NL); Juergen Siebdrat, Leuna (DE); Cornelis F. J. Den Doelder, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 3 days.

(21) Appl. No.: 15/761,317

(22) PCT Filed: Sep. 20, 2016

(86) PCT No.: PCT/US2016/052620
§ 371 (c)(1),
(2) Date: Mar. 19, 2018

(87) PCT Pub. No.: WO2017/058570
PCT Pub. Date: Apr. 6, 2017

(65) Prior Publication Data
US 2018/0265611 A1 Sep. 20, 2018

Related U.S. Application Data

(60) Provisional application No. 62/233,523, filed on Sep. 28, 2015.

(51) Int. Cl.
*C08F 2/01* (2006.01)
*C08F 2/38* (2006.01)
(Continued)

(52) U.S. Cl.
CPC .......... *C08F 110/02* (2013.01); *C08F 2/001* (2013.01); *C08F 2/01* (2013.01); *C08F 2/38* (2013.01);
(Continued)

(58) Field of Classification Search
None
See application file for complete search history.

(56) References Cited

U.S. PATENT DOCUMENTS 3,334,081 A 8/1967 Madgwick et al.
3,917,577 A 11/1975 Trieschmann et al.
(Continued)

FOREIGN PATENT DOCUMENTS

DE 276598 A3 3/1990

*Primary Examiner* — Richard A Huhn
(74) *Attorney, Agent, or Firm* — Quarles & Brady LLP

(57) ABSTRACT

Ethylene-based polymer is made by a process comprising polymerizing a reaction mixture comprising ethylene and at least one chain transfer agent system; wherein the polymerization takes place in the presence of at least one free-radical initiator; and wherein the polymerization takes place in a reactor configuration comprising at least one tubular reactor with at least three reaction zones; and wherein at least two reaction zones receive an ethylene feed; and wherein the degree of polymerization in the first reaction zone is less than, or equal to, $(5/LCBf)*3150$; and wherein the ethylene-based polymer formed by the process comprises the following properties: (A) $LCBf \geq (4.7+0.5*\log(I2))$; and (B) I2 from 0.2 to 25 dg/min.

10 Claims, 2 Drawing Sheets

Flow Scheme for actual polymerization

(51) Int. Cl.
*C08F 4/34* (2006.01)
*C08F 4/36* (2006.01)
*C08F 4/38* (2006.01)
*C08F 10/02* (2006.01)
*C08F 110/02* (2006.01)
*C08F 210/02* (2006.01)
*C08F 2/00* (2006.01)
*C08F 2/44* (2006.01)
*C08F 210/16* (2006.01)

(52) U.S. Cl.
CPC ............... *C08F 2/44* (2013.01); *C08F 10/02* (2013.01); *C08F 210/16* (2013.01); *C08F 4/34* (2013.01); *C08F 4/36* (2013.01); *C08F 4/38* (2013.01); *C08F 210/02* (2013.01); *C08F 2500/08* (2013.01); *C08F 2500/09* (2013.01); *C08F 2500/12* (2013.01); *Y02P 20/582* (2015.11)

(56) References Cited

U.S. PATENT DOCUMENTS

| | | |
|---|---|---|
| 9,120,880 B2 | 9/2015 | Zschoch et al. |
| 2010/0087606 A1 | 4/2010 | Karjala et al. |
| 2010/0317804 A1* | 12/2010 | Karjala .................. C08F 10/02 525/240 |
| 2011/0168427 A1* | 7/2011 | Smedberg ............... C08F 10/02 174/120 R |
| 2013/0333832 A1 | 12/2013 | Vittorias et al. |
| 2014/0288257 A1 | 9/2014 | Zschoch et al. |

* cited by examiner

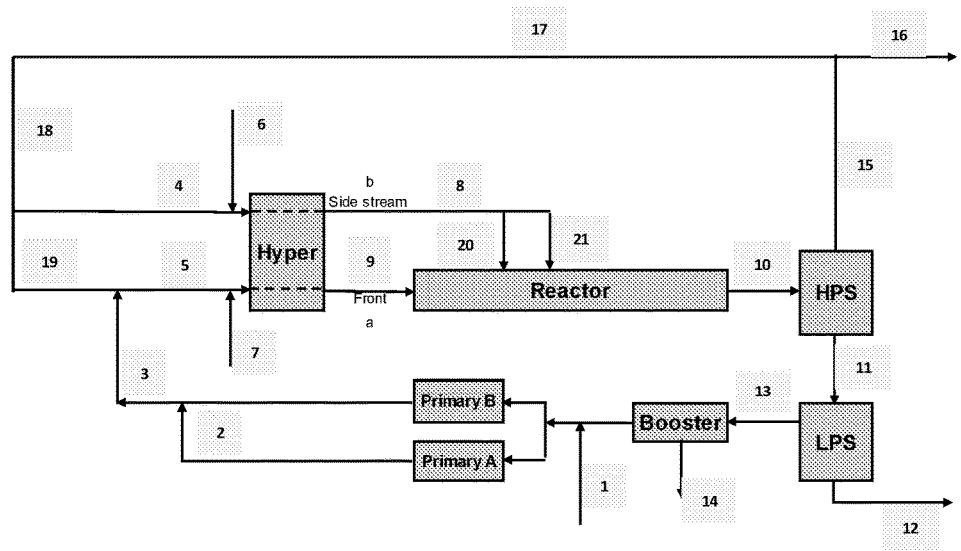
FIGURE 1: Flow Scheme for actual polymerization
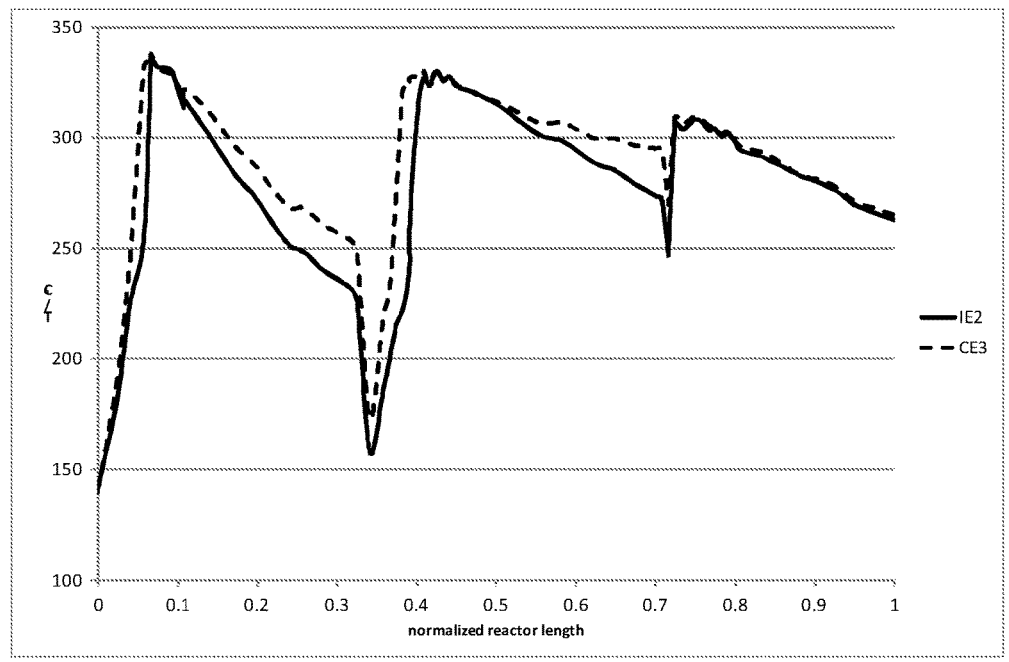
Figure 2: Temperature profile of IE2 and CE3 to illustrated severe fouling while making CE3

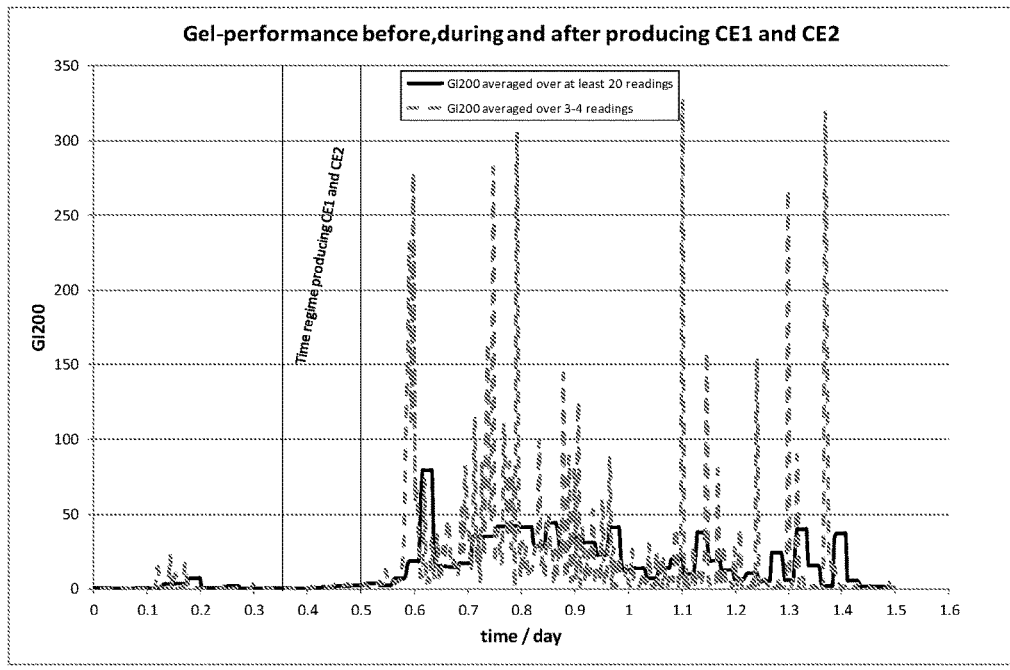
Figure 3: Gel performance before, during and after producing CE1 and CE2
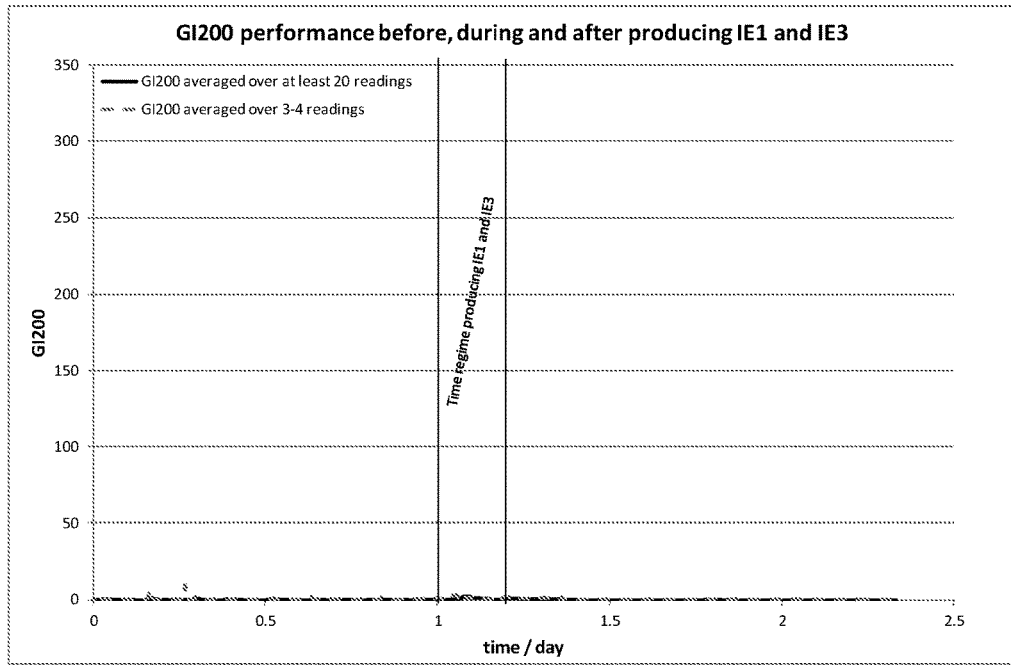
Figure 4: Gel performance before, during and after producing IE1 and IE3

PROCESS FOR PRODUCING ETHYLENE-BASED POLYMERS WITH REDUCED GEL COUNTS AND LOW REACTOR FOULING

REFERENCE TO RELATED APPLICATIONS

This application claims the benefit of U.S. Provisional Application No. 62/233,523, filed on Sep. 28, 2015, incorporated herein by reference.

FIELD OF THE INVENTION

This invention relates to a process of producing ethylene-based polymers with few, if any, gels and low reactor fouling.

BACKGROUND OF THE INVENTION

Very broad molecular weight distribution (MWD) resins can be efficiently produced in tubular, high pressure reactors by feeding all fresh ethylene (which is achieved through the lining-up of the primary compressor system to the secondary compressor system) to the front of the reactor. However, a very low or zero chain transfer agent (CTA) concentration fed to the front of the reactor can result in high gel levels (GI 200) as well as reactor fouling.

Reactor fouling and/or gel-formation in the product can happen instantaneous and/or delayed and both phenomena are thought to be related to each other. For instance formation of ultra-high molecular weight can lead to deposition of this polymer at the reactor wall or at the walls of the separator. This deposition in the reactor leads to fouling and reduced heat transfer. Removal of this deposited polymer in the reactor and/or separator can happen in a continuous manner during the production of this polymer, delayed until after the production of this polymer and/or in a non-continuous manner resulting in gel showers. The removal will improve heat transfer in the reactor, but it will also result in a temporarily higher and/or unacceptable gel-level in the product.

WO 2012/117039 (Basell 2012) describes fresh ethylene lineup to the front of the reactor to broaden the MWD of the resin. Less than 70% of the concentration in the reaction zones where the highest CTA concentration are injected/consumed.

U.S. Pat. No. 3,334,081 (Union Carbide; 1960) describes a tubular reactor with at least two separate feed streams, where the chain transfer agent is injected via the inlet as a mixture with ethylene and or is introduced in a side stream undiluted or as a mixture with ethylene.

U.S. Pat. No. 3,917,577 (BASF; 1975) describes a variation in CTA feed split to achieve a relatively narrow MWD resin.

DD 276 598 A3 (Leuna; 1988) describes a flexible line up of primary compressors to control oxygen levels in ethylene feed streams that resulted in very limited variation in CTA levels. The same line up, described in FIG. 2, without oxygen as initiator could be used to enhance distribution of CTA.

U.S. Pat. No. 9,120,880 describes a polymerization process with fresh ethylene distributions for preparation of low density ethylene-based polymers.

SUMMARY OF THE INVENTION

In one embodiment, the invention is a process to form an ethylene-based polymer, the process comprising polymerizing a reaction mixture comprising ethylene and at least one chain transfer agent system;

wherein the polymerization takes place in the presence of at least one free-radical initiator; and wherein the polymerization takes place in a reactor configuration comprising at least one tubular reactor with at least three reaction zones; and wherein at least two reaction zones receive an ethylene feed; and wherein the degree of polymerization in the first reaction zone is less than, or equal to, $(5/LCBf)*3150$; and wherein the ethylene-based polymer formed by the process comprises the following properties:
(A) $LCBf \geq (4.7+0.5*\log(I2))$; and
(B) I2 from 0.2 to 25 dg/min.

BRIEF DESCRIPTION OF THE DRAWINGS

FIG. 1 is a flow scheme for an actual polymerization of one embodiment of this invention.

FIG. 2 is a temperature profile of Inventive Example 2 (IE2) and Comparative Example 3 (CE3), and it reports the severe reactor fouling that occurred during the making of the ethylene-based polymer of CE3.

FIG. 3 is a graph reporting gel performance before, during and after producing the ethylene-based polymers in Comparative Examples 1 and 2 (CE1 and CE2).

FIG. 4 is a graph reporting gel performance before, during and after producing the ethylene-based polymers in Inventive Examples 1 and 3 (IE1 and IE3).

DETAILED DESCRIPTION OF THE PREFERRED EMBODIMENT

Embodiments of the Invention

In one embodiment, the invention is a process to prevent or reduce gel formation in a broad MWD ethylene-based polymer, the process comprising polymerizing a reaction mixture comprising ethylene and at least one chain transfer agent system as described above.

In one embodiment, the invention is a process for making a broad MWD ethylene-based polymer in which reactor fouling is prevented or reduced, the process comprising polymerizing a reaction mixture comprising ethylene and at least one chain transfer agent system as described above.

In one embodiment, the invention is a process for making a broad MWD ethylene-based polymer in which gel formation in the polymer is prevented or reduced and reactor fouling is prevented or reduced, the process comprising polymerizing a reaction mixture comprising ethylene and at least one chain transfer agent system as described above.

In one embodiment, fresh ethylene is fed to at least two reaction zones. In one embodiment, recycle ethylene is fed to at least two reaction zones. In one embodiment, fresh ethylene is fed to at least one reaction zone and recycle ethylene is fed to at least one reactions zone.

In one embodiment, the degree of polymerization in the first reaction zone is less than, or equal to, $(5/LCBf)*3150$, or $(5/LCBf)*3100$, or $(5/LCBf)*3050$, or $(5/LCBf)*3000$, or $(5/LCBf)*2950$.

In one embodiment, $LCBf \geq (4.7+0.5*\log(I2))$, or $LCBf \geq (4.8+0.5*\log(I2))$, or $LCBf \geq (4.9+0.5*\log(I2))$.

In one embodiment, the melt index (I2 or MI) is from 0.2 to 25, or from 0.3 to 22, or from 0.4 to 20, or from 0.4 to 16, or from 0.4 to 12, or from 0.4 to 10, or from 0.4 to 8, or from 0.4 to 6, decagrams per 10 minutes (dg/10 min).

In one embodiment of the process of any of the preceding embodiments, each feed to each reactor zone contains the same CTA system. In a further embodiment the CTA system of each feed contains a single CTA.

In one embodiment of the process of any of the preceding embodiments, at least one of the feeds to at least one of the reactor zones contains a CTA that is different from at least one of the CTAs to the other reactor zones.

In one embodiment of the process of any of the preceding embodiments, each CTA is independently one of an olefin, an aldehyde, a ketone, an alcohol, a saturated hydrocarbon, an ether, a thiol, a phosphine, an amino, an amine, an amide, an ester, and an isocyanate.

In one embodiment of the process of any of the preceding embodiments, each CTA is independently methyl ethyl ketone (MEK), propionaldehyde, butene-1, acetone, isopropanol or propylene.

In one embodiment, the conversion of ethylene to ethylene-based polymer is greater than, or equal to, 25%, or 27%, or 29%.

In one embodiment, the first reaction zone has an inlet pressure from 1,900 bar to 2,700 bar, or 2,000 bar to 2,600 bar, or 2,100 bar to 2,600 bar.

In one embodiment, the ethylene-based polymer formed by the process has a density from 0.914 g/cc to 0.924 g/cc, or from 0.915 g/cc to 0.923 g/cc, or from 0.916 g/cc to 0.922 g/cc or from 0.916 g/cc to 0.921 g/cc, or from 0.917 g/cc to 0.920 g/cc.

In one embodiment, the ethylene-based polymer is a homopolymer. In one embodiment, the ethylene-based polymer is high pressure, low density polyethylene (LDPE).

In one embodiment, the ethylene-based polymer comprises ethylene and one or more comonomers. In one embodiment, the comonomer is a C3-C20 alpha-olefin, and/or acrylic and/or methacrylic acid, and/or alkyl acetate and/or alkyl acrylates and/or alkyl meth-acrylates.

In one embodiment, within a period of 24 hours from the start of the production of the ethylene-based polymer, the ethylene-based polymer has an average GI200 value that is less than 25 mm$^2$/24.6 cm$^3$, or less than 20 mm$^2$/24.6 cm$^3$, or less than 15 mm$^2$/24.6 cm$^3$, or less than 10 mm$^2$/24.6 cm$^3$.

In one embodiment, within a period of 24 hours from the start of the production of the ethylene-based polymer, the ethylene-based polymer has a maximum GI200 value of less than 125 mm$^2$/24.6 cm$^3$, or less than 100 mm$^2$/24.6 cm$^3$, or less than 75 mm$^2$/24.6 cm$^3$, or less than 50 mm$^2$/24.6 cm$^3$.

In one embodiment, the ethylene-based polymer comprises hexane extractables of less than 4.0, or 3.5 or 3.0, wt % based on the weight of the polymer.

The invention also provides a composition comprising an inventive ethylene-based polymer, as described herein.

In one embodiment, the composition further comprises an ethylene/α-olefin interpolymer with a density less than or equal to 0.954 g/cc.

In one embodiment, the composition further comprises another ethylene-based polymer that differs from the inventive ethylene-based polymer in one or more properties, for example, density, melt index ($I_2$), melt elasticity, melt strength, weight average molecular weight (Mw(abs)), number average molecular weight (Mn(conv)), and/or polydispersity index (Mw(abs)/Mn(conv)).

The invention also provides an article comprising at least one component formed from an inventive composition.

In one embodiment, the article is a film or coating, for example, an extrusion coating.

In one embodiment, the article is a film. In another embodiment, the article is a coating.

In one embodiment, the article is a coating for a wire or cable. In one embodiment, the wire or cable is an electrical or telecommunications wire or cable.

In one embodiment, the article is a coated sheet, and in a further embodiment the sheet is selected from a metal, a paper, or another polymer substrate or combinations thereof. In a further embodiment, the coated sheet is used in a wire or cable configuration. In another embodiment, the coated sheet is used in a packaging application.

An inventive ethylene-based polymer may comprise a combination of two or more embodiments as described herein.

An inventive composition may comprise a combination of two or more embodiments as described herein.

An inventive article may comprise a combination of two or more embodiments as described herein.

Polymerizations

For a high pressure, free radical initiated polymerization process, two basic types of reactors are known. In the first type, an agitated autoclave vessel having one or more reaction zones is used: the autoclave reactor. In the second type, a jacketed tube is used as reactor, which tube has one or more reaction zones: the tubular reactor. The high pressure process of the present invention to produce polyethylene homo or copolymers having the advantageous properties as found in accordance with the invention, can be carried out in a tubular reactor having at least 2 reaction zones or in a combination of a tubular reactor and an autoclave.

The temperature in each tubular reactor zone of the process is typically from 100 to 400, more typically from 150 to 350 and even more typically from 160 to 320, ° C. "High pressure" as here used means that the pressure in each tubular reactor zone of the process is at least 100 MPa, and is typically from 100 to 400, more typically from 120 to 360 and even more typically from 150 to 320, MPa. The high pressure values used in the process of the invention have a direct effect on the amount of chain transfer agent, for example MEK or propionaldehyde, incorporated into the polymer. The higher the reaction pressure is, the more chain transfer agent derived units are incorporated into the product.

In one embodiment, such a conventional tubular reactor is cooled by an external water jacket and has at least one injection point for initiator and/or monomer. Suitable, but not limiting, reactor lengths can be between 500 and 1500 meters. The autoclave reactor normally has several injection points for initiator and/or monomer. The particular reactor combination used allows conversion rates of above 25 percent.

Ethylene-Based Polymer

The term ethylene-based polymer as used in the present description and the claims refers to polymers of ethylene and, optionally, one or more comonomers. Suitable comonomers that can be used to make the ethylene-based polymers of the present invention include, but are not limited to, ethylenically unsaturated monomers and especially $C_{3-20}$ alpha-olefins, unsaturated carboxylic acids, carbon monoxide, vinyl ester, and $C_{2-6}$ alkyl acrylates and meth-acrylates.

Ethylene-based polymers include LDPE homopolymer (preferred) and copolymers, and copolymers include, but are not limited to, ethylene/alpha-olefin copolymers, ethylene/vinyl acetate (EVA), ethylene ethyl acrylate (EEA), and ethylene acrylic acid (EAA).

Broad MWD and high LCBf-levels containing ethylene-based polymers, e.g., high pressure low density polyethylene, are needed for a variety of extrusion applications, and are particularly useful in controlling the rheology in the molten state of the pure or blended polymer. For example, the polymers of this invention are useful in controlling, keeping low, the neck-in during extrusion coating.

Initiators

The process of the present invention is a free radical polymerization process. The type of free radical initiator to be used in the present process is not critical. Free radical initiators are generally used to produce the inventive ethylene-based polymers. A free radical initiator, as used here, refers to a free radical generated by chemical and/or radiation means. Exemplary free radical initiators include organic peroxides including, but not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. Furthermore oxygen can be used as initiator. In one embodiment, these organic peroxide initiators are used in an amount from 0.001-0.2 wt %, based upon the weight of polymerizable monomers.

Peroxide initiator can be characterized and classified with their half-life temperature at certain time intervals. For instance the half-life temperature at 0.1 h indicates the temperature at which an initiator is dissociated into radicals for 50% in 0.1 h or 6 minutes. AkzoNobel show in their brochure "Initiators for High Polymers" half-life temperatures at 0.1, 1.0 and 10 h for their commercial organic peroxide initiators. Due to typical residence times of less than five minutes in high pressure reactor system and less than two minutes in the individual reactor zones the half-life temperature at 0.1 h are relevant for the classification and selection of organic peroxide initiators.

Organic peroxides are often applied in mixtures of lower and higher temperature initiators, in order to start and/or accelerate temperature development by the lowest temperature initiator class, while the control temperature, respectively maximum zone temperature for autoclave reaction zone and maximum peak temperature for tubular reactor zone, is controlled and determined by the highest temperature initiator class.

The mixture of single or multiple initiators, potentially diluted with a solvent, injected into a reaction zone i is called initiation system for reaction zone i.

In one embodiment oxygen is used alone, or in combination with other initiators, as a high temperature initiator.

In one embodiment, an initiator is added to at least one reaction zone, and the initiator has a half-life temperature, at one second, greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX™ 301 (3,6,9-triethyl-3,6,9-trimethyl-1,4,7-triperoxonaan) and TRIGONOX™ 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain Transfer Agents (CTA)

Chain transfer agents or telogens are used to control the melt flow index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence, the molecular weight. The melt flow index (MFI or I2) of a polymer, which is related to molecular weight, is controlled in the same way.

The chain transfer agents used in the process of this invention include, but are not limited to, aliphatic and olefinic hydrocarbons, such as pentane, hexane, cyclohexane, propene, pentene or hexane; ketones such as acetone, diethyl ketone or diamyl ketone; aldehydes such as formaldehyde or acetaldehyde; and saturated aliphatic alcohols such as methanol, ethanol, propanol or butanol. Chain transfer agent can be present as impurities deriving from incoming ethylene such as methane and ethane, as dissociation products from applied initiator systems such as acetone and tert-butanol etc. and solvents to dilute the initiators or as added CTA components to control product MI. Preferred chain transfer agents to control MI are those with a chain transfer constant (Cs) of at least 0.001 (e.g., propane, isobutane), more preferably at least 0.01 (e.g., propylene, isopropanol, acetone, 1-butene), and even more preferably at least 0.05 (e.g., methyl ethyl ketone (MEK), propionaldehyde, tert-butanethiol). Additionally chain transfer agents like propylene or butane-1 can lower product density through additional SCB-formation by copolymerization. The Cs is calculated as described by Mortimer at 130° C. and 1360 atmospheres (Ref. No. 1-3 under Table A, infra.). The top Cs value typically does not exceed 25, more typically it does not exceed 21.

In one embodiment, the amount of chain transfer agent used in the process of the present invention is from 0.03 to 10.0 percent by moles, preferably from 0.06 to 6.0 percent by moles, more preferably from 0.1 to 4.0 percent by moles based on the amount of monomer introduced in the reactor system.

Typically, the manner of the introduction of the CTA into a high pressure process and the control of the CTA level along the reactor for making broad MWD and high level LCBf containing ethylene-based polymers can vary widely as long as the CTA and/or ethylene is freshly injected into at least one reaction zone other than the first reaction zone. Typically the CTA is fed to a downstream ($2^{nd}$ and/or $3^{rd}$ and/or $4^{th}$, etc.) reaction zone along with ethylene and/or other reaction components, e.g., comonomers, initiator, additives, etc. In the practice of this invention, however, a minimum amount of CTA, is fed to the front end of the first reaction zone in order to limit the initial molecular weight (DP) to a certain value. Surprisingly, this results in the prevention or significant reduction in gel formation in broad MWD and high level LCBf containing ethylene-based polymers and reactor fouling.

In one embodiment, make-up CTA, i.e., CTA replacement for the CTA consumed in the reactor, is fed together with fresh ethylene through direct injection and/or along with the injected peroxide solution.

In one embodiment the concentration of fresh ethylene in the ethylene based feed to the $1^{st}$ reaction zone is higher than the concentration of fresh ethylene in ethylene based feeds to the remaining reaction zone(s).

In one embodiment the concentration of ethylene coming of the high pressure recycle in the ethylene based feed to the $1^{st}$ reaction zone is lower than the concentration of the ethylene coming from the high pressure recycle in the ethylene feed based feeds to the remaining reaction zones.

In one embodiment, the CTA comprises a monomeric group, like propylene, butane-1, etc. The monomeric group enhances reactor conversion (it increases the consumption of the CTA).

In one embodiment, the CTA and/or operating conditions in the recycle sections are selected such that the CTA will condense and/or separate from the recycle ethylene resulting in less CTA recycled back to the reactor inlet.

In one embodiment, CTA is purged from the reactor system in a downstream process section.

In one embodiment, the CTA system comprises two or more CTAs.

Blends

The inventive polymers can be blended with one or more other polymers such as, but not limited to, linear and ethylene butyl acrylate (EBA). Product applications include collation shrink film, label film, blown and cast film, blow molding, foam, compounding/master batch and injection molding applications etc. for both medium density (≥0.926 g/cm$^3$) and standard density low density polyethylene (LLDPE), copolymers of ethylene with one or more alpha-olefins such as, but not limited to, propylene, butene-1, pentene-1,4-methylpentene-1, pentene-1, hexene-1 and octene-1; high density polyethylene (HDPE) such as HDPE grades HD 940-970 available from The Dow Chemical Company. The amount of inventive polymer in the blend can vary widely, but typically it is from 10 to 90, from 10 to 50, or from 10 to 30, wt %, based on the weight of the polymers in the blend. If the inventive polymer has a relatively narrow MWD (e.g., below 6) then the inventive polymer typically constitutes a majority of the blend, i.e., it is LDPE-rich, and contains 50 or more wt % of the inventive polymer, based on the weight of the polymers in the blend. If the inventive polymer has a relatively broad MWD (e.g., 6 or above), then the inventive polymer typically constitutes a minority of the blend, i.e., it is LDPE-poor, and contains less than 50 wt % of the inventive polymer, based on the weight of the polymers in the blend. LDPE-rich blends typically provide good optics, and/or are useful in the preparation of laminations. LDPE-poor blends typically exhibit good processability, and/or are useful in such applications as film blowing and extrusion coating.

Additives

One or more additives may be added to a composition comprising an inventive polymer. Suitable additives include stabilizers, fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils. In addition, other natural and synthetic polymers, including other polymers that are made according to the inventive process, and polymers made by other processes, may be added to an inventive composition.

Definitions

Unless stated to the contrary, implicit from the context, or customary in the art, all parts and percentages are based on weight, and all test methods are current as of the filing date of this application.

The term "composition," as used herein, includes a mixture of materials, which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer and the term "interpolymer" as defined below. Trace amounts of impurities may be incorporated into and/or within the polymer.

The term "degree of polymerization (DP) in the first reaction zone" refers to the highest degree of polymerization in the first reaction zone. This highest degree of polymerization is typically the degree of polymerization in the beginning of the first reaction zone. The degree of polymerization (DP) is the number of monomer units forming a polymer chain and is calculated with the rate of propagation divided by the sum of all terminations steps. The degree of polymerization at the beginning of the first reaction zone has to be calculated with the process conditions within 1 m distance, 0.1 s elapsed time and 1° C. temperature rise after the introduction of an initiator system to first reaction zone.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer.

The term "ethylene-based interpolymer" refers to an interpolymer that comprises a majority amount of polymerized ethylene, based on the weight of the interpolymer, and at least one comonomer.

The term "ethylene-based copolymer" refers to a copolymer that comprises a majority amount of polymerized ethylene, based on the weight of the interpolymer, and a comonomer as the only monomer types.

The term "CTA system," as used herein, refers to the type and amount of CTA used in a reactor system having two or more reactors or reaction zones. A CTA system can comprise one or more CTAs.

The term "alkyl," as used herein, refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls have 1 to 20 carbon atoms.

The term "high pressure polymerization process," as used herein, refers to a free radical polymerization process carried out at an elevated pressure of at least 1000 bar (100 MPa).

The term "mass fraction," as used herein, refers to the mass ratio of one component in a mixture to the total mass of the mixture. Mass fraction can be determined by calculating the ratios between mass amounts or mass flows.

The terms "feed" or "feed stream," as used herein, refer to fresh and/or recycled component added to a reaction zone at an inlet. A feed may consist of CTA, or ethylene, or comprise CTA and ethylene.

The term "feed component(s)," as used herein, refers to the component(s) added to a reaction zone at the inlet to the reaction zone.

The terms "ethylene feed" or "ethylene feed stream," as used herein, refer to the fresh ethylene and/or recycled ethylene and other reactant(s) added to a reaction zone at the inlet to the reaction zone.

The terms "side stream" or "side feed stream," as used herein, refer to the ethylene-rich feed stream (majority wt % ethylene based on the total weight of components in the stream) to sequential reaction zones.

The term "make-up," when used herein in reference to a reactant (i.e., "make-up ethylene," "make-up CTA" etc.), refers to the feed stream of the reactant needed to compensate for the converted and/or lost reactant in the high polymerization process.

The term "fresh," when used herein in reference to a reactant and/or component (i.e., fresh ethylene", or "fresh comonomer", etc), refers to reactant provided from an external source(s) and not provided internally from a recycled source(s). For example, in an embodiment, fresh ethylene is used as "make-up ethylene" required to compensate for the ethylene consumed by the polymerization and/or lost through, for example, purge from the process and residual ethylene in the polymer.

The term "recycle stream," as used herein, refers to recycled ethylene, and, optionally, other reactants and/or other components that are separated from the polymer after exiting a reactor and are fed to one or more reaction zones at the inlet to each reaction zone.

The term "reactor configuration," as used herein, refers to the components (devices) used to polymerize and isolate a polymer. Such components/devices include, but are not limited to, one or more reactors, a Secondary compressor, a Primary compressor, and a Booster compressor.

The term "reaction zone," as used herein, refers to a reactor zone where polymerization reaction is initiated or reinitiated by the addition of free radicals and/or components which dissociate into and/or generate free radicals. Typically, the reaction medium is heated and/or cooled by a heat transfer medium flowing through the jacket around the reactor. A reaction zone may also start with the addition of fresh ethylene and/or free radicals or components which dissociate into and/or generate free radicals.

The term "first reaction zone," as used herein, refers to the first reactor zone where the polymerization is initiated by the addition of radicals or components which dissociate into and/or generate radicals. The first reaction zone ends at the point where there is a new feed of fresh and/or recycled ethylene, radicals, and/or components which dissociate into and/or generate radicals.

The terms "subsequent reaction zone," or "sequential reaction zone," as used herein, refer to a reactor zone which receives ethylene and polymer from a previous reactor zone, and where radicals and/or components which dissociate into and/or generate radicals are added at the inlet of the subsequent (or sequential) reactor zone. The subsequent (or sequential) reaction zone ends at the point where there is a new feed of fresh and/or recycled ethylene, radicals, and/or components which dissociate into and/or generate, radicals; however, the nth reaction zone ends at the position of a pressure control device of the reactor system. The number of subsequent (or sequential) reaction zones is (i−1), where i is the total number of reaction zones.

The term "injection point," as used herein, refers to the inlet location of a device (used in a polymerization process) where a feed stream is added to the device.

The terms "chain transfer constant" and "chain transfer coefficient," Cs value, as used herein, refer to the ratio between the "rate of chain transfer" to the "rate of ethylene propagation." See Mortimer references provided in Experimental section.

The term "chain transfer activity," as used herein, refers to the sum of molar concentration of each applied CTA component multiplied with its chain transfer constant (Cs). The chain transfer constant (Cs) is the ratio of reaction rates $k_s/k_p$, determined at a reference pressure of 1360 atm and a reference temperature of 130° C. See Mortimer references provided in Experimental section.

The term "activity of a CTA system," as used herein, refers to the sum of the products of a CTA's concentration and its Cs value for each CTA in the CTA system. (See Equation B)

The Booster compressor (Booster) is a device that compresses the following: a) the low pressure recycle coming from the LPS (Low pressure Separator), and b) optionally, the recycled compressor packing leaks, each to the pressure level required at the inlet side of the Primary compressor. This compression can take place in one or multiple compression stages, and can be combined with intermediate cooling. A Booster can consist of single or multiple compressor frames, and can be potentially combined with Primary compressor frame(s).

The Primary compressor (Primary) is a device that compresses the following: a) the fresh incoming ethylene, and/or b) the low pressure recycle coming from the Booster, and/or c) the recycled compressor packing leaks, each to the pressure level required at the inlet side of the Hyper compressor. This compression can take place in one or multiple compression stages, and can be combined with intermediate cooling. The Primary can consist of single or multiple compressor frames, and can be potentially combined with Booster compressor frame(s).

Hyper compressor (Hyper), or Secondary compressor, is a device that compresses the following: a) the ethylene coming from the HPR (High Pressure Recycle), and/or b) the Primary, each to a pressure level required to feed the reactor at its inlet pressure set point. This compression can take place in one or multiple compression stages, and can be combined with intermediate cooling. The Hyper comprises a plunger reciprocating compressor, and can consist of single or multiple compressor frame(s).

The term "long chain branching frequency (LCBf)" used herein refers to the ratio described below, relating to the transfer to polymer steps leading to long chain branches per 1000 C-atoms (or 500 ethylene units) converted in polyethylene. Typically LCBf is the average number of the whole polymer. This ratio can be determined via NMR or be calculated via simulations. The numbers used herein are derived by simulations. The LCBf derived by simulations is the ratio of transfer to polymer reaction rate $R_{LCB}$ and the propagation rate $R_p$ and multiplied the ratio by 500 for deriving a ratio per 1000 carbons or 500 ethylene units. $R_{LCB}=k_{LCB}*[Rad]*[Pol]$ and $R_p=k_p*[Rad]*[Ethylene]$. To derive the total LCBf of the whole polymer the ratio has to be integrated over the temperature, pressure, ethylene conversion and polymer formation profile of the used reactor. This is typically done in a simulation software like PREDICI, version 4, by CiT or similar programs which are able to solve differential equations.

The term "continuous production" as used herein, refers to the application of the inventive operation with a minimum application time of 4 hours.

The term "transitioning away from the inventive operation" as used herein, refers to the transitioning from the continuous production using the inventive operation to the production of a product wherein the degree of polymerization in the first reaction zone is less than, or equal to, 2500; and wherein the ethylene-based polymer formed by the process comprises the following properties:
(A) LCBf≤(4.2+0.5*log(I2)); and
(B) I2≥0.2 to 25 dg/min.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Broad molecular weight distribution is indicated by LCB content and product MI as expressed in the equation LCBf≥ (4.7+0.5*log(MI)).

Test Methods

Density—

Samples are prepared according to ASTM D4703, Annex A, Method C. Samples are pressed at 190° C. and 3,000 psi for five minutes, 15 tons for two minutes, and then cooled, under pressure, at 15° C./min. Measurements are made within one hour of sample pressing using ASTM D792, Method B.

Melt Index—

Melt index, or I2, is measured in accordance with ASTM D 1238, Condition 190° C./2.16 kg, and is reported in grams eluted per 10 minutes (g/10 min).

Gel Content Measurement

1. Apparatus:

The apparatus consists of a 4-zone laboratory extruder, Model OCS ME 20, with a "150 mm ribbon die (cast film die)," a CR-8 winding unit, an air knife, and an FS-3 line scan camera (50 micron resolution; available from OCS Optical Control Systems GmbH Hullener Feld 36, 58454 Witten, Germany, or an equivalent).

2. Material-Specific Settings for Film—

Manufacturing: The temperature setting for the heating zones at cylinder and die is determined for an ethylene-based polymer according to MFR-ranges in two groups, as follows:

Group 1: MFR-range 1.5-3 g/10 min (190° C./2.16 kg), temperatures: 160 (first zone)/180/180/180/180° C. (die).

Group 2: MFR-range 3-6 g/10 min (190° C./2.16 kg), temperatures: 150/150/150/150/150° C.

Preset Parameters: Rotational speed (screw): 70 rpm; Haul-off speed: 4 m/min; the cast film thickness is 76 μm±5 μm.

3. Measurement:

One analysis inspects volume of "24.6 cm$^3$" film which corresponds to a "0.324 m$^2$" surface area for a film thickness of 76 μm.

GI200 is the sum of the areas of all gels greater than 200 μm in diameter in each measurement. Diameter of gel is determined as the diameter of a circle having equivalent area.

4. Analysis:

average GI200=the average of at least 20 measurement of GI200. The maximum GI200 is maximum value of the measurements.

Standard Method for Hexane Extractables—

Polymer pellets (from the polymerization pelletization process, without further modification; approximately 2.2 grams per press) are pressed in a Carver Press at a thickness of 3.0-4.0 mils. The pellets are pressed at 190° C. for 3 minutes at 40,000 pound-force (lbf). Non-residue gloves (PIP* CleanTeam* CottonLisle Inspection Gloves, Part Number: 97-501) are worn to prevent contamination of the films with residual oils from the hands of the operator. Films are cut into 1-inch by 1-inch squares, and weighed (2.5±0.05 g). The films are extracted for two hours in a hexane vessel containing about 1,000 ml of hexane, at 49.5±0.5° C., in a heated water bath. The hexane used is an isomeric "hexanes" mixture (for example, Hexanes (Optima), Fisher Chemical, high purity mobile phase for HPLC and/or extraction solvent for GC applications). After two hours, the films are removed, rinsed in clean hexane, and dried in a vacuum oven (80±5° C.) at full vacuum (ISOTEMP Vacuum Oven, Model 281A, at approximately 30 inches Hg) for two hours. The films are then place in a desiccators, and allowed to cool to room temperature for a minimum of one hour. The films are then reweighed, and the amount of mass loss due to extraction in hexane is calculated. This method is based on 21 CRF 177.1520 (d)(3)(ii), with one deviation from FDA protocol by using hexanes instead of n-hexane.

Melt Strength:

Melt strength measurements are conducted on a Gottfert Rheotens 71.97 (Gottfert Inc.; Rock Hill, S.C.) attached to a Gottfert Rheotester 2000 capillary rheometer. A polymer melt (about 20-30 grams, pellets) is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die, with an acceleration of 2.4 mm/s$^2$. The tensile force is recorded as a function of the take-up speed of the nip rolls. Melt strength is reported as the plateau force (cN) before the strand broke. The following conditions are used in the melt strength measurements: plunger speed=0.265 mm/second; wheel acceleration=2.4 mm/s$^2$; capillary diameter=2.0 mm; capillary length=30 mm; and barrel diameter=12 mm. Calculations for the Activity of the CTA System:

The "reactor zone molar concentration of a CTA j in a reactor zone i ([CTA]ji)" is defined as the "total molar amount of that CTA freshly injected to reactor zones 1 to i" divided by the "total molar amount of ethylene freshly injected to reactor zones 1 to i." This relationship is shown below in Equation A.

$$[CTA]_{j_i} = \frac{\sum_{k=1}^{i} n_{CTA,j_k}}{\sum_{k=1}^{i} n_{eth_k}} \quad \text{(Eq. A)}$$

In Equation A, j≥1 $n_{CTA,j}$, is the "amount of moles of the jth CTA freshly injected to the ith reactor zone," and $n_{eth_i}$ is the "amount of moles of ethylene freshly injected to the ith reactor zone."

The "transfer activity of a CTA (system) in a reactor zone i" is defined as the "sum of the reactor zone molar concentration of each CTA in the reactor zone" multiplied with its chain transfer activity constant (Cs). The chain transfer activity constant (Cs) the ratio of reaction rates Ks/Kp, at a reference pressure (1360 atm) and a reference temperature (130° C.). This relationship is shown below in Equation B, where $n_{comp}i$ is the total number of CTAs in reactor zone i.

$$Z_i = \sum_{j_i=1}^{n_{comp,i}} [CTA]_{j_i} \cdot C_{s,j} \quad \text{(Eq. B)}$$

The chain transfer constant (Cs) values for some chain transfer agents are shown below in Table A, showing chain transfer constants (Cs) derived by Mortimer at 130° C. and 1360 atm for example chain transfer agents.

TABLE A

Cs-Values as Measured by Mortimer at 130° C. and 1360 atm in References 1-3 and Derived Activation Energies

| Component | Cs at 130° C., 1360 atm | | Cs at 200° C., 1360 atm | | ΔEa | |
|---|---|---|---|---|---|---|
| | value | dev | value | dev | cal/mole | dev |
| Methane | 0 | ±0.0002 | | | | |
| Ethane | 0.0006 | ±0.0005 | | | | |
| Propane | 0.00302 | ±0.0003 | 0.00652 | ±0.00002 | 4200 | ±300 |
| Isobutane | 0.0072 | ±0.0003 | 0.0136 | ±0.0005 | 3500 | ±600 |
| n-Decane | 0.012 | ±0.001 | | | | |
| Propylene | 0.0122 | ±0.0008 | 0.02 | ±0.0006 | 2700 | ±800 |
| Butene-1 | 0.047 | ±0.002 | 0.057 | ±0.004 | 1100 | ±1000 |
| PA | 0.33 | ±0.01 | 0.283 | ±0.004 | −800 | nd |

The data in Table A shows a logarithmic correlation between measured Cs values and derived delta activation energies. It was shown to be difficult to obtain accurate estimate of the Cs values for methane and ethane. For these components the following Cs values at 130° C. and 1360 atm of respectively 0.0001 and 0.0006 were assumed.

With the help of above indicated correlation between Cs value and activation energy the following delta activation energies were derived for respectively methane, ethane and n-decane: 8200, 6200 and 2850 cal/mole. The measurement values for delta activation volume by Mortimer varied around 3 cc/mole; however for PA a value of 11.3 cc/mole was derived. The kinetic parameters are summarized in Table 2.

References
Ref No. 1. G. Mortimer; Journal of Polymer Science: Part A-1; Chain transfer in ethylene polymerization; vol 4, p 881-900 (1966).
Ref No. 2. G. Mortimer; Journal of Polymer Science: Part A-1; Chain transfer in ethylene polymerization. Part IV. Additional study at 1360 atm and 130° C.; vol 8, p 1513-1523 (1970).
Ref No. 3. G. Mortimer; Journal of Polymer Science: Part A-1; Chain transfer in ethylene polymerization. Part VII. Very reactive and depletable transfer agents; vol 10, p 163-168 (1972).

When only one CTA is used in the total reactor system, Equation B simplifies to Equation C.

$$Z_i = [CTA]_i \cdot C_s \quad \text{(Eq. C)}$$

Polymerization Simulations (Inventive and Comparative)

A polymerization simulation model with applied reaction scheme and kinetics is described by Goto et al, see reference below. Other reactor and product modeling frameworks are available through Aspen Plus of Aspen Technology, Inc., Burlington, Mass., USA; and PREDICI (version 4, available from Wulkow Computing in Technology (CiT)), Rastede, Germany. Process and product responses predicted by these model frameworks are determined by the reactor parameters and the applied reaction scheme and kinetic parameters. The applied reaction scheme and kinetic parameters are described below. For each well-stirred autoclave reaction zone one calculation cell can be used. For each tubular reaction zone enough calculation cells are used to accurately represent the pressure, temperature and concentration profiles along the tubular reaction zone, such that the simulated product and process results, as reported in the simulated results (see Table 5), do not change with the addition of more cells.

The polymerization simulations are achieved with Goto LDPE simulation model as described in the following: S. Goto et al; Journal of Applied Polymer Science: Applied Polymer Symposium, 36, 21-40, 1981 (Title: Computer Model for Commercial High Pressure Polyethylene Reactor Based on Elementary Reaction Rates Obtained Experimentally).

The kinetic data used by Goto et al. is derived from high pressure free radical polyethylene polymerization experiments performed at varying temperature, pressure and polymer concentrations as described in the following: K. Yamamoto, M. Sugimoto; Rate Constant for Long Chain-Chain Branch Formation in Free-Radical Polymerization of Ethylene; J. Macromol. Science-Chem., A13 (8), pp. 1067-1080 (1979). The following elementary reaction steps are described by Goto et al.: i) propagation of ethylene, ii) termination of radicals, iii) backbiting or short chain branching (SCB) formation, iv) transfer to polymer or long chain branching (LCB) formation, v) beta elimination of secondary radicals leading to vinyl formation, and vi) beta elimination of tertiary radicals leading to vinylidene formation.

See Table 2 for kinetic data for main reactions, where ko is the pre-exponential or frequency factor; Ea is the activation energy, reflecting the temperature dependence; and ΔV is the activation volume, reflecting the pressure dependence. All kinetic constants are from Goto et al., except the ko, Ea and ΔV values for backbiting, which have been optimized to better reflect the level of methyl branches (as may be analyzed by $C^{13}$ NMR technique) in high pressure polyethylene, as a function of pressure and temperature conditions.

TABLE 1

Kinetic Constants for Main Reactions

| | Reaction | | |
|---|---|---|---|
| | ko | Ea | ΔV |
| | Units | | |
| | m3/h/kmol | cal/mol | cc/mol |
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs is given in Table 3. The kinetic constants are calculated with the help of the kinetic constants on the Cs-value (ks/kp), as determined by Mortimer (see references below), and the ethylene propagation kinetics as given by Goto et al. (see Table 1).

TABLE 2

Kinetic Constants for Selected CTAs

| | Chain Transfer to Modifier | | | Reactivity Ratios | |
|---|---|---|---|---|---|
| Component | kao m3/h/kmol | Ea cal/mol | ΔV cc/mol | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| methane | 1.78E+12 | 18720 | −16.7 | 0.00 | 0.00 |
| ethane | 8.78E+11 | 16720 | −16.7 | 0.00 | 0.00 |
| n-decane | 2.68E+11 | 13370 | −16.7 | 0.00 | 0.00 |

Chain transfer activity and comonomer reactivity scheme data are described in the following: P. Ehrlich, G. A. Mortimer, *Fundamentals of the Free Radical Polymerization of Ethylene, Adv. Polymer Sci., Vol 7*, 386-448 (1970); G. Mortimer, *Journal of Polymer Science: Part A-1; Chain Transfer in Ethylene Polymerization*; Vol. 4, p 881-900 (1966); G. Mortimer, *Journal of Polymer Science: Part A-1, Chain Transfer in Ethylene Polymerization. Part IV. Additional Study at* 1360 atm and 130° C. Chain transfer activity and comonomer reactivity scheme data are described in the following: P. Ehrlich, G. A. Mortimer, *Fundamentals of the Free Radical Polymerization of Ethylene, Adv. Polymer Sci.*, Vol 7, 386-448 (1970); G. Mortimer, *Journal of Polymer Science: Part A-1; Chain Transfer in Ethylene Polymerization*; Vol. 4, p 881-900 (1966); G. Mortimer, *Journal of Polymer Science: Part A-1, Chain Transfer in Ethylene Polymerization. Part IV. Additional study at 1360 atm and 130° C.*; vol 8, p 1513-1523 (1970); G. Mortimer, Journal of Polymer Science: Part A-1, Chain transfer in ethylene polymerization. Part V. The effect of temperature; vol 8, p 1535-1542 (1970); G. Mortimer, Journal of Polymer Science: Part A-1, Chain transfer in ethylene polymerization Part V. The effect of pressure, vol 8, p 1543-1548 (1970); and G. Mortimer, Journal of Polymer Science: Part A-1, Chain transfer in ethylene polymerization VII. Very reactive and depleteable transfer agents, vol 10, pp. 163-168 (1972). 8, p 1513-1523 (1970); G. Mortimer, Journal of Polymer Science: Part A-1, Chain transfer in ethylene polymerization. Part V. The effect of temperature; vol 8, p 1535-1542 (1970); G. Mortimer, Journal of Polymer Science: Part A-1, Chain transfer in ethylene polymerization Part V. The effect of pressure, vol 8, p 1543-1548 (1970); and G. Mortimer, Journal of Polymer Science: Part A-1, Chain transfer in ethylene polymerization VII. Very reactive and depleteable transfer agents, vol 10, pp. 163-168 (1972).

Calculation of the Degree of Polymerization of the Starting Polymer

The degree of polymerization (DP) in the first reaction zone (calculated at the beginning of the first reaction zone using the process conditions within 1 m distance, 0.1 s elapsed time and 1° C. temperature rise after the introduction of an initiator system to first reaction zone) is the number of monomer units forming a polymer chain and is calculated with the rate of propagation divided by the sum of all terminations steps. For the starting polymer long chain branching can be neglected so that $$DP = R_p / (R_t + R_{tr} + R_{beta} + R_{beta'})$$  Eq. A wherein
$R_p$ is the rate of propagation=$k_p*[Ethylene]*[Rad]$,
$R_t$ is the rate of termination=$k_t*[Rad]^2$,
$R_{tr}$ is the rate of transfer steps by a CTA=$\Sigma k_{tr,n}*[CTA_n d]*[Rad]$; n is the number of different CTAs,
$R_{beta}$ is the rate of beta elimination of a secondary radical=$k_{beta}*[Rad]$
$R_{beta'}$ is the rate of beta elimination of a tertiary radical=$k_{beta'}*[Rad]$ The temperature and pressure dependence of the rate coefficients are given in Tables 1 and 2.

The ethylene concentration [Ethylene] is calculated via the ethylene density ρ(Ethylene) in kg/m³=0.0572*p/bar−0.4621*T/° C.+469.14

[Ethylene]=ρ(Ethylene)/28.05 kg/kmol*x(Ethylene)

x(Ethylene) is the molar fraction of ethylene in reaction mixture=1−Σx(CTA$_n$)

The molar fraction of the CTA x(CTA) is taken from simulations to obtain the actual MI of the final product. In the simulation the PA molar fraction is set to match the amount of make-up PA. The methane and ethane molar fraction is set to match the impurity level in the HPR.

To obtain the final product MI the n-decane molar fraction is set. n-Decane is used as model component for the initiator solvent and remaining impurities like dissociation products of the intiator system like acetone and tert-butanol. The initiator solvent will build-up to an equilibrium concentration in the recycle-system. The solvent concentration in the process is influenced through the addition rate together with the initiators, the conversion level in the reactor by the solvent Cs-value, its condensation behavior the booster/primary compressor and ethylene based purge flow from the process.

The radical concentration is assumed to be constant at [Rad]=1*10$^{-7}$ kmol/m³ for all cases. This level of radical concentration is typically not exceeded within 1 m distance, 0.1 s elapsed time and/or 1° C. temperature rise after the introduction of an initiator system to first reaction zone. The claim boundaries-values are based on this radical concentration and will be affected when different kinetic parameters for e.g. propagation, transfers reaction and/or scission reactions are applied. Applying a different set of kinetics will lead to different DP-values however the inventive principle will remain and people skilled in the art will be able to adjust the critical boundaries in this application for the change in kinetics given in Tables 1 and 2 to their proprietary kinetics.

Example Calculation for Comparative Example 1

$T$=140° C., $p$=2080 bar, $x(PA)$=85 ppm, $x$(Methane)= 6600 ppm, $x$(Ethane)=10560 ppm, $x$($n$-Decane)= 3125 ppm where
x(Ethylene)=0.9796
ρ(Ethylene)=523.4 kg/m³
[Ethylene]=18.31 kmol/m³

The rate coefficient of each reaction step at 140° C. and 2080 bar are reported in Table 3.

TABLE 3

Rate Coefficient of Each Reaction Step at 140° C. and 2080 Bar

| kP m3/h/kmol | kt m3/h/kmol | ktr PA m3/h/kmol | ktr Methane m3/h/kmol | ktr Ethane m3/h/kmol | ktr n-Decane m3/h/kmol | kbeta 1/h | kbeta' 1/h |
|---|---|---|---|---|---|---|---|
| 5.052E+06 | 3.534E+09 | 1.283E+06 | 6.188E+02 | 3.457E+03 | 6.231E+04 | 1.052E+04 | 5.776E+03 |

The reaction rates of each reaction step at 140° C. and 2080 bar are reported in Table 4.

TABLE 4

Reaction Rates of Each Reaction Step at 140° C. and 2080 Bar

| Rp kmol/m3/h | Rt kmol/m3/h | Rtr kmol/m3/h | Rbeta kmol/m3/h | Rbeta' kmol/m3/h |
|---|---|---|---|---|
| 9.252E+00 | 7.067E−05 | 6.307E−04 | 1.052E−03 | 5.776E−04 |

Finally, the DP can be calculated to 3968 monomer units using CTA concentrations in the first reaction zone to match PA make-up flows, impurities in HPR and product MI (See Table 5).

TABLE 5

CTA Concentrations

| Case # | PA concentration mol-ppm | methane concentration mol-ppm | ethane concentration mol-ppm | n-decane concentration mol-ppm |
|---|---|---|---|---|
| CE1 | 85 | 6600 | 10560 | 3125 |
| CE2 | 250 | 5885 | 9416 | 2825 |
| CE3 | 370 | 5140 | 8224 | 5080 |
| IE1 | 530 | 4950 | 7920 | 2000 |
| IE2 | 780 | 5110 | 8176 | 3420 |
| IE3 | 700 | 5170 | 8272 | 1900 |

Description of Flow Diagram Used for Inventive and Comparative Example

FIG. 1 shows the flow scheme of the high pressure polymerization process with a tubular reactor used to produce the Inventive and Comparative Examples. Stream (1), fresh ethylene make-up, is compressed together with the outlet of the Booster by Primary compressor system resulting in flow (2) and (3). Stream (2) and (3) is combined with the high pressure recycle stream (19) and fed through line 5 to the Hyper compressor part feeding the front (9) of the Reactor. The Hyper compressor part feeding the side stream (8) receives ethylene feed through line (4). The ethylene supplied by line (8) is distributed through line (20) and (21) to the side of the reactor. Line (4) receives ethylene feed from line (18). The CTA is fed through lines (6) and/or (7). The Hyper pressurizes the ethylene feed streams to a level sufficient to feed the high pressure tubular reactor (Reactor).

In the reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and liquids and/or solids are removed in stream (17). Stream (16) is a purge stream to remove impurities and/or inerts.

The polymer separated in LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary compressors.

General Description of the Actual Polymerization Examples

The polymerization is carried out in tubular reactor with three reaction zones. See FIG. 1. The observed pressure drop is about 300 bar. The non-converted ethylene, and other gaseous components in the reactor outlet, are recycled through the high pressure recycle and low pressure recycle, and are compressed and distributed through the booster, primary and hyper (secondary) compressor systems, according to the flow scheme as shown in FIG. 1. This configuration leads to the lowest ratios of CTA concentration in the front ethylene-based feed versus the concentrations of CTA in sequential ethylene-based feed streams.

In each reaction zone, the polymerization is initiated with organic peroxides as described in Table 6. After reaching the first peak temperature in reaction zone 1, the reaction medium is cooled with pressurized water fed countercurrent to each reaction zone. At the outlet of the first reaction zone, the reaction medium is further cooled by injecting a fresh, cold ethylene-rich feed stream (20), and the reaction is initiated again, by feeding an organic peroxide system into the reaction zone. This process is repeated at the end of the second reaction zone, to enable further polymerization in the third reaction zone.

For the chain transfer agent, propionaldehyde (PA) is used, and it is present in each reactor inlet, originating from the low and high pressure recycle flows (13 and 15), as well as from freshly injected CTA make-up stream (6) and/or (7). The make-up ethylene is fed through stream (1). The following parameters are output from the modeling software: LCBf and SCBf.

TABLE 6

Initiators

| Initiator | Abbreviation | Used in Rx-zone 1/2/3 |
|---|---|---|
| tert-butyl peroxy-2-ethyl hexanoate | TBPO | yes/yes/no |
| di-tert-butyl peroxide | DTBP | yes/yes/yes |
| 3,6,9-triethyl-3,6,9-trimethyl-1,4,7-peroxonane | TETMP | yes/yes/no |

Comparative Example 1

Comparative Example 1 is made according the described process above. The obtained MI is 0.37. 39.4 g (PA)/t (LDPE) were fed to first reaction zone, 19.7 g (PA)/t (LDPE) to second reaction zone and 6.6 g (PA)/t (LDPE) to third reaction zone. The impurity level in the HPR is 3.9 volume percent (vol) %. The conversion level is 27.6%. Further information can be found in the Tables 7-9 and FIGS. 2-4. Process instabilities are encountered.

Comparative Example 2

Comparative Example 2 is made according the described process above. The obtained MI is 0.58. 117 g (PA)/t (LDPE) were fed to first reaction zone, 43.2 g (PA)/t (LDPE) to second reaction zone and 12.3 g (PA)/t (LDPE) to third reaction zone. The impurity level in the HPR is 4.0 vol %.

The conversion level is 29.3%. Further information can be found in the Tables 7-9 and FIGS. 2-4. Process instabilities are encountered.

Comparative Example 3

Comparative Example 3 is made according the described process above. The obtained MI is 3.95. 199 g (PA)/t (LDPE) were fed to first reaction zone, 115 g (PA)/t (LDPE) to second reaction zone and 36.2 g (PA)/t (LDPE) to third reaction zone. The impurity level in the HPR is 3.2 vol %. The conversion level is 29.6%. Further information can be found in the Tables 7-9 and FIGS. 2-4. Process instabilities are encountered.

Inventive Example 1

Inventive Example 1 is made according the described process above. The obtained MI is 0.75. 323 g (PA)/t (LDPE) were fed to first reaction zone. The impurity level in the HPR is 3.4 vol-%. The conversion level is 29.2%. Further information can be found in the Tables 7-9 and FIGS. 2-4.

Inventive Example 2

Inventive Example 2 is made according the described process above. The obtained MI is 3.88. 480 g (PA)/t (LDPE) were fed to first reaction zone, 161 g (PA)/t (LDPE) to second reaction zone and 50.9 g (PA)/t (LDPE) to third reaction zone. The impurity level in the HPR is 3.2 vol-%. The conversion level is 31.9%. Further information can be found in the Tables 7-9 and FIGS. 2-4.

Inventive Example 3

Inventive Example 3 is made according the described process above. The obtained MI is 1.18. 323 g (PA)/t (LDPE) were fed to first reaction zone, 83.5 g (PA)/t (LDPE) to second reaction zone and 26.4 g (PA)/t (LDPE) to third reaction zone. The impurity level in the HPR is 3.5 vol %. The conversion level is 28.6%. Further information can be found in the Tables 7-9 and FIGS. 2-4.

TABLE 7

Process Conditions of Actual Polymerizations

| Case # | Ethylene split % | p inlet bar | Peak temperatures °C. | (Re)initiation temperatures °C. | Side stream temperature °C. | Impurities in HPR vol-% | Conversion wt-% | Pressurized water inlet Temperature °C. |
|---|---|---|---|---|---|---|---|---|
| CE1 | 50/38/12 | 2080 | 327/323/299 | 140/173/243 | 55 | 3.9 | 27.6 | 180 |
| CE2 | 50/38/12 | 2080 | 330/325/299 | 140/169/243 | 55 | 4.0 | 29.3 | 180 |
| CE3 | 50/38/12 | 2080 | 338/331/310 | 140/173/271 | 55 | 3.2 | 29.6 | 200 |
| IE1 | 50/38/12 | 2080 | 331/326/300 | 140/160/248 | 58 | 3.4 | 29.2 | 175 |
| IE2 | 50/38/12 | 2070 | 338/330/308 | 140/158/247 | 55 | 3.2 | 31.9 | 180 |
| IE3 | 50/38/12 | 2080 | 338/329/301 | 140/161/248 | 57 | 3.5 | 28.6 | 178 |

TABLE 8

Simulation Results of Actual Polymerization

| Case # | MI* dg/min | DP** — | logMI Log(dg/min) | SCBf/ 1000C | LCBf/ 1000C | LCBf Limit***/ 1000C | DP Limit**** — |
|---|---|---|---|---|---|---|---|
| CE1 | 0.37 | 3968 | −0.432 | 29.1 | 4.96 | 4.48 | 3175 |
| CE2 | 0.58 | 3461 | −0.237 | 29.1 | 5.08 | 4.58 | 3100 |
| CE3 | 3.95 | 2887 | 0.597 | 30.8 | 5.48 | 5.00 | 2874 |
| IE1 | 0.75 | 2882 | −0.125 | 28.9 | 5.10 | 4.64 | 3088 |
| IE2 | 3.88 | 2322 | 0.589 | 30.1 | 5.74 | 4.99 | 2744 |
| IE3 | 1.25 | 2612 | 0.097 | 29.3 | 5.39 | 4.75 | 2922 |

*MI is measured, not calculated
**Calculated per Eq. A above
***LCBf Limit = (4.7 + 0.5 * log(MI))
****DP Limit = (5/LCBf) * 3150

TABLE 9

Product Properties of Actual Polymerizations

| Case # | MI* dg/min | density g/cm$^3$ | Hexane Extractables wt % | MS cN |
|---|---|---|---|---|
| CE1 | 0.37 | 0.9180 | 2.61 | 29.9 |
| CE2 | 0.58 | 0.9180 | 2.52 | 26.8 |
| CE3 | 3.95 | tbm | tbm | tbm |
| IE1 | 0.75 | 0.9183 | 2.47 | 24.1 |
| IE2 | 3.88 | tbm | tbm | tbm |
| IE3 | 1.25 | 0.9180 | 2.82 | 19.7 |

*MI is measured, not calculated

Discussion of the Invention

Surprisingly it was found that the reactor fouling and product gel-formation is not affected by the MI of the final product. Rather, it is caused by the operation at low CTA activity in the first reaction zone while producing broad MWD-resins. The transition boundary between low and high risk fouling and gel-formation operation can be established as function of initial molecular weight in the first reaction zone and long chain branching of the final product.

What is claimed is:
1. A process to form an ethylene-based polymer, the process comprising polymerizing a reaction mixture comprising ethylene and at least one chain transfer agent system;
wherein the polymerization takes place in the presence of at least one free-radical initiator;
wherein the polymerization takes place in a reactor configuration comprising at least one tubular reactor with at least three reaction zones wherein at least two of the reaction zones receive an ethylene feed;
wherein the degree of polymerization in the first reaction zone (DP) and the long chain branching frequency

(LCBf) of the ethylene-based polymer formed by the process satisfy the following relationship:

DP≤(5/LCBf)×3150; and wherein the ethylene-based polymer formed by the process comprises the following properties:
(A) melt index $I_2$ as measured according to ASTM D 1238 (190° C., 2.16 kg) of from 0.2 to 25 dg/min; and
(B) LCBf≥(4.7+0.5×log($I_2$)).

2. The process of claim 1, wherein degree of polymerization in the first reaction zone is less than, or equal to, (5/LCM)*3100.

3. The process of claim 1, wherein the ethylene feed to the at least two reaction zones is fresh ethylene.

4. The process of claim 1, wherein the ethylene feed to the at least two reaction zones is recycle ethylene.

5. The process of any of the preceding claims, wherein the first reaction zone has an inlet pressure from 1,900 bar to 2,700 bar.

6. The process of claim 1, wherein the ethylene-based polymer formed by the process has a density from 0.914 g/cc to 0.923 g/cc.

7. The process of claim 1, wherein the ethylene-based polymer formed by the process is an ethylene homopolymer or a low density polyethylene (LDPE).

8. The process of claim 1, wherein the ethylene-based polymer formed by the process is an ethylene-based copolymer comprising ethylene and an alpha-olefin of 3 to 20 carbon atoms.

9. The process of claim 1, wherein the at least one chain transfer agent system comprises only one chain transfer agent.

10. The process of claim 1, wherein the ethylene-based polymer formed by the process comprises hexane extractable of less than 3.5 wt % based upon the weight of the polymer.

* * * * *